Patented Jan. 6, 1953

2,624,676

UNITED STATES PATENT OFFICE 2,624,676

PROCESS FOR MAKING GLACÉD OR CANDIED FRUIT

Elias R. Mako, Cleveland, Ohio

No Drawing. Application January 17, 1951,
Serial No. 206,525

6 Claims. (Cl. 99—102)

This invention relates to a process for making glacéd or candied fruit wherein the juice or moisture content of the fruit is replaced by a heavy sugar syrup. More particularly, it relates to a process for making glacéd cherries.

Heretofore the glacéing of fruit, especially cherries, has been a slow process requiring about 10 to 16 weeks and of necessity has been costly; it has also been a severe process by virtue of the length of time the fruit was subjected to treatment and because of the fact that the fruit was subjected to elevated temperatures, including boiling temperatures, in every step of the process. The proposed method of this invention provides a number of advantages over the older procedure, chief of which are a much shorter processing time, a superior product, and a greater yield of product.

Briefly, the invention comprises first treating the fruit with an aluminum salt, then replacing the juice of the fruit with syrup at room temperature in a series of syruping steps, preferably about 3 to about 5 steps, to bring the fruit to a state where it contains syrup having a sugar concentration of about 37° Bé., then raising the temperature of the fruit while it is immersed in syrup and continuing the syrup-for-juice exchange steps until the syrup concentration within the cherries is at least 40° Bé. The candied fruit so produced may be preserved indefinitely.

Considering the invention in more detail, and as applied to the making of candied cherries, the latter are usually received in 50-gallon barrel lots, each lot weighing about 250 lbs. As obtained from the supplier, the cherries, in bleached condition, are in a sodium chloride-sulphur dioxide preserving solution, which is first removed, and then the cherries are suitably washed while in the original barrel. After washing, the barrel containing the cherries is half filled with warm water and the usual amount, say about 0.05% by weight based on the weight of the cherries, of a permissible red dye such as Ponceau 3R or Erythrosin, is added. Then a few per cent, say from about 1% or less to about 3 or 4%, preferably 1 to 2.2%, by weight of an aluminum salt, based on the weight of the cherries, is added. As aluminum salts, aluminum sulfate, potassium alum, ammonium alum, aluminum acetate, aluminum chloride, aluminum citrate, and aluminum potassium tartrate, all of which are water-soluble, are suitable, with the preferred salt being aluminum sulfate. It is desirable that these salts be free of iron, for it has been found that ferrous iron in the presence of sulphur dioxide may produce an undesirable darkening or discoloration of the fruit, while if ferric iron is present, it may be reduced to ferrous iron and hence is also undesirable. Sulfur dioxide in small amounts may be present due to incomplete washing of the fruit. A suitable wetting agent, for example sodium lauryl sulfate, may also be added to the solution in the barrel to facilitate the dyeing of the cherries. The barrel is next filled with warm water, stoppered, and mixed as by rolling. The cherries are allowed to stand in the solution for 3 to 7 days, the barrel being rolled twice a day. With riper cherries, the storage period should be greater than with less ripe fruit. At the end of the storage period, the cherries are thoroughly dyed and are firm to the touch. The barrel is opened and the solution removed by means of a pump, which takes but a few minutes and does not expose the fruit to damage.

The foregoing treatment places the cherries in a favorable condition for enabling the juice to be rapidly displaced by the syrup. The displacement or replacement of the fruit juice is started by adding to the cherries in the barrel at 25° Bé. syrup prepared from either cane or corn sugar. Enough syrup is added at least to cover the cherries and the latter are then allowed to stand in the syrup. Under these conditions the phenomenon of osmosis takes place, the original juice of the cherries passing out therefrom and being replaced by the syrup which enters within the cherries. After about 6 hours, the cherries and syrup are agitated by inserting an airline into the barrel and slowly passing air therethrough so as to gently agitate the contents of the barrel without in any way bruising the fruit. The agitation may be repeated after another 6-hour interval. Twenty-four hours after the introduction of the syrup, a substantial equilibrium between the moisture leaving the cherries and the syrup entering the cherries is deemed to be established; the syrup surrounding the cherries is pumped from the barrel and a 30° Bé. syrup is added. The treatment of the cherries in contact with the 30° Bé. syrup, and subsequent syrups, is the same as described for the 25° Bé. syrup. Following the 30° Bé. syrup, syrups of 35° Bé., 38° Bé., and 41° Bé. may be employed, making a total of five syruping steps. As indicated above, a lesser number of such steps, say 3 or 4, or a greater number, up to 7, may be employed, the main consideration being to secure within the cherries a syrup having a concentration of about 37° Bé. without the use of heat. The use of 5 steps as described has been found to be satisfactory for producing cherries containing a 37° Bé. syrup. The attainment of such a concentration level within the cherries may be ascertained by measuring the concentration of the syrup surrounding the cherries. For example, when the 41° Bé. syrup is used in the foregoing sequence, it will usually be found that this syrup will decline in concentration to about 37° Bé. after being in contact with the cherries for 24 hours.

The cherries containing 37° Bé. syrup, while still immersed in syrup, are then heated, preferably by indirect heat exchange, to a temperature of 160–170° F., which temperature is then maintained for the balance of the process. This temperature level is useful because it enables syrup of higher sugar concentrations to be used and it increases the fluidity of the syrup. However, the time during which the cherries are subjected to this temperature is held to a minimum. As soon as the cherries and syrup are up to temperature, the surrounding syrup is removed and replaced by a syrup of higher concentration and allowed to stand about 4 hours with gentle stirring. Additional replacing syrups may be employed until the concentration of the syrup within the cherries is at least about 40° Bé., measured at 160–170° F. (about 43° Bé. at room temperature). The first of these replacing syrups at the elevated temperature may be a 43° Bé. syrup, the resulting mixture being stirred by means of a wooden paddle. After about 4 hours, the syrup may be replaced by one of greater sugar concentration, and conveniently this may be done by removing half the syrup surrounding the cherries, adding solid, "crystalline" sugar to the half so removed and stirring to obtain a concentration of about 44° Bé. or more. If cane sugar is added to the removed portion of syrup, an appropriate amount of a suitable food acid such as citric, tartaric or phosphoric should be added during mixing to produce sucrose inversion and thus prevent crystallization in the product. Next, the remaining half of the syrup surrounding the cherries is removed and the make-up syrup of at least 44° Bé. concentration is added to the cherries. The mixture is allowed to stand for about 3 or 4 hours after which it is usually found that the concentration of syrup within the cherries is at least about 40° Bé., measured hot. This point may be determined by the fact that the cherries will settle in the hot syrup and taking a Bé. reading showing that the density of the syrup within the fruit is substantially the same as the density of the syrup surrounding the fruit. If the Bé. does not read 41° (hot), the last step may be repeated except that one-fourth of the syrup is removed, leaving three-fourths in contact with the cherries. Then one half the portion removed may then be made up by adding sugar until the concentration is at least 44° Bé.

When the syrup in the cherries is at least 40° Bé. (hot), the syruping process is completed. The cherries are removed hot, dipped rapidly into hot water (about 180° F.), then dipped at once into a glazing solution, removed and allowed to drain and dry. While any suitable glazing solution may be employed, it is preferred to use a solution comprising a mixture of pectin and locust bean gum powder extract. This may be made by adding about 8 ozs. of 150 grade pectin and about 2 ozs. of locust bean gum powder extract to about 10 gallons of hot water. A small amount of benzoate of soda, say about 1.25 oz., is added as perservative and a suitable amount of wetting agent, such as sodium lauryl sulfate, to produce considerable foaming. The use of this glazing solution provides a glaze which adheres evenly and tenaciously to the fruit, and which is less expensive than glazes employing pure pectin.

The method as described is much more rapid than those practiced heretofore, being as much as 90% faster. Also, the cherries produced by the proposed method are superior to those of the older methods in respect of their color, texture, appearance and taste. The length of time during which the cherries were processed by the older methods and the continuous use of elevated temperatures tended to affect the color of the fruit. The proposed method avoids discoloration by virtue of its reduced processing time and its reduced use of elevated temperatures. Fruit of firmer texture is made available because the concentration of sugar in the replacement syrups is quite high, higher than in the older methods. Not only this, but the present fruit product is plump and has the natural appearance of cherries. Also, by reducing the time during which elevated temperatures are employed, and by operating at temperatures substantially below boiling, the fruit product of the proposed method has no taste of burnt sugar which, due to overheating, frequently characterized the older products. Furthermore, the present method provides fruit yields which represent an increase of about 15 to 25% as compared to increases of only a few percent for the older methods. With these advantages, the method is also considerably cheaper to operate.

Although the invention has been described in relation to a selected embodiment of the same, it will be appreciated that it is capable of obvious variations without departing from its scope.

In the light of the foregoing description, the following is claimed:

1. Process of making glacéd cherries which comprises placing bleached cherries in contact with an aqueous solution containing a red dye and about 1 to about 2.2% by weight of iron-free aluminum sulfate, based on the weight of the cherries, for a period of 3 to 7 days, removing the cherries from the solution, then replacing the juice of the cherries with sugar syrup in a series of steps, the first step of which comprises placing the cherries at room temperature in contact with a syrup having a sugar concentration of about 25° Bé. for a period of one day, removing the syrup, and repeating such step a plurality of times using a more concentrated syrup each time until a syrup having a sugar concentration of 41° Bé. is employed, then raising the temperature of the cherries and syrup in contact therewith to 160–170° F., replacing the latter syrup with a 43° Bé. syrup and allowing the cherries and syrup to stand at 160–170° F., and repeating the last step using a more concentrated syrup until the cherries settle therein and the concentration of the surrounding syrup, measured at 160–170° F., falls to 40° Bé., removing the cherries from the hot syrup, washing and then glazing the same.

2. Process of making glacéd cherries which comprises placing cherries in contact with an aqueous solution containing about 1 to about 2.2% by weight of aluminum sulfate, based on the weight of the cherries, for a period of 3 to 7 days, removing the cherries from the solution, then replacing the juice in the cherries with sugar syrup in a series of steps, the first step of which comprises placing the cherries at room temperature in contact with a syrup for a period of one day, removing the syrup, and repeating such step about 3 to 5 times using a more concentrated syrup each time until the juice of the cherries has been replaced by a syrup having a sugar concentration of about 37° Bé., then raising the temperature of the cherries and syrup in contact therewith to 160–170° F., replacing the latter syrup with a syrup of higher sugar concentration and allowing the cherries and syrup to stand at 160–170° F., and repeating the last step using a more concentrated syrup until the concentration of the syrup within the cherries is at least about 40° Bé., measured at 160–170° F., and then separating the cherries from the hot syrup.

3. Process of making glacéd cherries which comprises placing bleached cherries in contact with an aqueous solution containing a red dye and about 1 to about 2.2% by weight of an iron-free aluminum salt, based on the weight of the cherries, for a period of 3 to 7 days, removing the cherries from the solution, then replacing the juice of the cherries with sugar syrup in a series of steps, the first step of which comprises placing the cherries at room temperature in contact with a syrup having a sugar concentration of about 25° Bé. for a period of one day, removing the syrup, and repeating such step a plurality of times using a more concentrated syrup each time until the juice of the cherries has been replaced by a syrup with a sugar concentration of about 37° Bé., then raising the temperature of the cherries and syrup in contact therewith to 160–170° F., replacing the latter syrup with a 43° Bé. syrup and allowing the cherries and syrup to stand at 160–170° F., and repeating the last step using a more concentrated syrup until the concentration of the syrup within the cherries is at least about 40° Bé., measured at 160–170° F., removing the cherries from the hot syrup, washing and then glazing the same.

4. Process of making glacéd cherries which comprises placing cherries in contact with an aqueous solution containing a few per cent by weight of an aluminum salt, based on the weight of the cherries, for a period of a few days, removing the cherries from the solution, then replacing the juice in the cherries with sugar syrup in a series of steps, the first step of which comprises placing the cherries at room temperature in contact with a syrup for a period of about one day, removing the syrup, and repeating such step a plurality of times using a more concentrated syrup each time until the juice of the cherries has been replaced by a syrup having a sugar concentration of about 37° Bé., then raising the temperature of the cherries and syrup in contact therewith to 160–170° F., replacing the latter syrup with a syrup of higher sugar concentration and allowing the cherries and syrup to stand at 160–170° F., and repeating the last step until the concentration of the syrup within the cherries is at least about 40° Bé., measured at 160–170° F.

5. Process of making glacéd cherries which comprises placing cherries in contact with an aqueous solution containing a few per cent by weight of an aluminum salt, based on the weight of the cherries, for a period of a few days, removing the cherries from the solution, then replacing the juice in the cherries with sugar syrup in a series of steps, the first step of which comprises placing the cherries at room temperature in contact with a syrup for a period of about one day, removing the syrup, and repeating such step a plurality of times using a more concentrated syrup each time until the juice of the cherries has been replaced by a syrup having a sugar concentration of about 37° Bé., then raising the temperature of the cherries and syrup in contact therewith to 160–170° F., replacing the latter syrup with a syrup of higher sugar concentration and allowing the cherries and syrup to stand at 160–170° F., and repeating the last step using a more concentrated syrup until the concentration of the syrup within the cherries is at least about 40° Bé., measured at 160–170° F., removing the cherries from the hot syrup, washing and then glazing the same.

6. Process of making glacéd cherries which comprises placing cherries in contact with an aqueous solution containing a few per cent by weight of an aluminum salt, based on the weight of the cherries, for a period of a few days, removing the cherries from the solution, then replacing the juice in the cherries with sugar syrup in a series of steps, the first step of which comprises placing the cherries at room temperature in contact with a syrup for a period of about one day, removing the syrup, and repeating such step a plurality of times using a more concentrated syrup each time until the juice of the cherries has been replaced by a syrup having a sugar concentration of about 37° Bé., then raising the temperature of the cherries and syrup in contact therewith to 160–170° F., replacing the latter syrup with a syrup of higher sugar concentration and allowing the cherries and syrup to stand at 160–170° F., and repeating the last step using a more concentrated syrup until the concentration of the syrup within the cherries is at least about 40° Bé., measured at 160–170° F., removing the cherries from the hot syrup, washing the same, and then glazing the cherries with a glazing solution comprising pectin and locust bean gum.

ELIAS R. MAKO.

REFERENCES CITED

The following references are of record in the file of this patent:

UNITED STATES PATENTS

| Number | Name | Date |
|---|---|---|
| 1,532,476 | Cruess | Apr. 7, 1925 |
| 1,906,295 | Wickenden | May 2, 1933 |
| 2,233,447 | Dolman | Mar. 4, 1941 |
| 2,340,145 | Rogers | Jan. 25, 1944 |